No. 877,122. PATENTED JAN. 21, 1908.
E. REAGAN.
BALE FORMING APPARATUS.
APPLICATION FILED JULY 7, 1906.

WITNESSES:

Edgar Reagan,
INVENTOR.

By

ATTORNEYS

No. 877,122. PATENTED JAN. 21, 1908.
E. REAGAN.
BALE FORMING APPARATUS.
APPLICATION FILED JULY 7, 1906.

WITNESSES:

Edgar Reagan,
INVENTOR.

By C. A. Snow & Co.
ATTORNEYS

No. 877,122.

PATENTED JAN. 21, 1908.

E. REAGAN.
BALE FORMING APPARATUS.
APPLICATION FILED JULY 7, 1906.

WITNESSES:

Edgar Reagan,
INVENTOR.

By C. A. Snow & Co.
ATTORNEYS

UNITED STATES PATENT OFFICE.

EDGAR REAGAN, OF SAN ANTONIO, TEXAS, ASSIGNOR, BY MESNE ASSIGNMENTS, TO REAGAN BALE COMPANY, OF SAN ANTONIO, TEXAS.

BALE-FORMING APPARATUS.

No. 877,122.　　　Specification of Letters Patent.　　　Patented Jan. 21, 1908.

Application filed July 7, 1906. Serial No. 325,123.

To all whom it may concern:

Be it known that I, EDGAR REAGAN, a citizen of the United States, residing at San Antonio, in the county of Bexar and State of Texas, have invented a new and useful Bale-Forming Apparatus, of which the following is a specification.

This invention relates to machines of that class employed in the formation of round bales of cotton or other material.

One of the principal objects of the invention is to provide a machine which will form a bale of any desired diameter, and when that diameter is reached, will automatically discharge the bale from the machine.

A further object of the invention is to provide a machine which may be employed to advantage in the formation of a small bale or core of cotton between intervals of operation of a main roller press, and which will discharge the small bale or core to the main press without breaking or severing the bat, so that the bat may be rolled, and the bale completed in the main press.

A still further object of the invention is to provide a machine which may be employed both as a bale or core forming machine, and also as a condenser for the bat during the feeding of the latter to the roller press.

A still further object of the invention is to provide a roller press in which provision is made for changing the direction of rotation of certain of the rollers for the purpose of delivering a complete bale from the press.

A still further object of the invention is to provide a roller press and bat condenser which may be controlled either automatically or by hand for the purpose of severing the bat passing therethrough, and starting the rolling of the bat into the form of a bale.

A still further object of the invention is to provide a roller press in which one of the rollers is arranged to form a bat severing means.

A still further object of the invention is to provide a roller press in which an endless belt is utilized in connection with the rollers during the bale forming operation, and acts also to assist in the delivery of the finished bale from the machine.

A still further object of the invention is to provide a rolling machine having rolls so arranged and driven that they may be utilized to feed and condense a bat, or may stop the feeding operation and roll the bat into the form of a bale or core.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings.

Similar numerals of reference are employed to indicate corresponding parts throughout the several figures of the drawings.

The machine is mounted on a suitable base or sole plate 10, the central portion of which is recessed for the reception of a fluid pressure cylinder 11 which may be in the nature of a hydraulic ram, and connected to a suitable source of fluid pressure supply. At the several corners of the base are vertical standards 12 which may be in the form of round iron bars, the upper ends of which are slightly reduced in diameter for the reception of housings 15 which are locked in place by nuts 16 that are mounted on the threaded upper ends of said rods. The two housings are connected by one or more brace bars 17 which are bolted in place and the upper end of each housing is provided with a bearing for the support of a driven shaft 18 having fast and loose pulleys 19 and 20, which may receive a suitable driving belt.

The rods 12 serve as guides for the reception of a pair of vertically movable housings 21 which carry the lower compression rolls, and these housings are connected by a suitable cross bar 22 that is connected to the upper end of the plunger 23 of the hydraulic ram. In the upper portion of the cylinder 11 is a packing 24 that is held in place by a gland ring 25, and this ring has an upwardly extending tapered flange 26, the internal diameter of which is somewhat greater than the diameter of the plunger, so that any of the oil or other liquid which may escape from the cylinder around the plunger may be retained by the flange and will flow off to a suitable reservoir or other convenient point through a drain pipe 27 that is tapped into said flange.

The lower vertically movable housings 21 are provided with bearings for the support of a pair of compression roll shafts 28 and 29, on which are mounted compression rolls 30 and 31, respectively, these rolls being preferably formed of end headers 32 and a connecting cylinder 33 which forms the body portion of the roll. The lower housings are further provided with bearings for the reception of a transversely disposed shaft 34 which is provided at one end with a pinion 35 intermeshing with two gear wheels 36, one of which is keyed or otherwise secured to the shaft 28, while the other is secured to the shaft 29, and when movement is imparted to the shaft 34, said shafts 28 and 29 will be rotated in the same direction and at the same speed. The intermediate shaft 34 is provided at that end opposite the pinion 35 with a bevel wheel 37, that intermeshes with a bevel pinion 38 secured to or formed integral with an elongated sleeve 39, the opposite reduced end portions of which are mounted in bearings formed in a pair of brackets 40 that project from the side of one of the movable housings. This sleeve 39 is provided with a non-circular bore which, in the present instance, is shown as of rectangular form in cross section and receives the correspondingly shaped lower end of a vertical shaft 41, the upper portion of such shaft being circular in cross section and being supported in a bearing 42 that projects from one of the upper fixed housings. At the extreme upper end of the shaft is a bevel gear 43 which intermeshes with a bevel pinion 44 on the main shaft 18, and so long as the latter shaft is rotated, movement will be imparted to the shaft 34, no matter what the position of the lower housings may be. The bevel gear carrying sleeve 39 is moved up and down with the lower housings and the pinion 38 remains in constant mesh with and permits movement of the bevel gear 37.

In suitable bearings in the upper fixed housing is a hollow rock shaft 46 which forms a bearing for a transversely disposed shaft 47, said shaft 47 being provided at one end with a pinion 48, and at the opposite end with a bevel gear 49 which is in constant mesh with two oppositely disposed bevel pinions 50 and 51. These pinions are mounted loosely on the circular portion of the vertical shaft 41, and each is provided with a toothed clutch hub which may be engaged by clutching teeth formed at the opposite ends of a clutching sleeve 52 that is feathered on the shaft 41 and rotates therewith, but is free to move longitudinally of the shaft in order to engage first one and then the other of the bevel gears and lock the same to the shaft. The clutch sleeve is provided with an annular groove for the reception of the bifurcated end of a clutch operating lever 45 that is carried by a rock shaft 55 mounted in bearings formed in a pair of brackets 56 that project from the fixed housing.

The two fixed housings are provided with bearings for the reception of a roller shaft 60 carrying one of the upper compression rollers 61, and at one end of said shaft 60 is a gear wheel 62 that is in constant mesh with the pinion 48, and receives motion first in one direction and then in the opposite direction, as determined by the position of the clutch sleeve 52.

The upper fixed housings are also provided with transversely extending slots 64, the walls of which are on arcuate lines struck from the axis of the shaft 47, and through these slots extend sleeves 66 which form bearings for the opposite end portions of a shaft 67 carrying the upper compression roller 68. The sleeves 66 may swing in the slots with the axis of the shaft 47 as the center of movement, so that the roller 68 may be moved toward and from the lower rear roller 31.

Rigidly secured to the end portions of the hollow shaft 46 at points on opposite sides of each of the fixed housings are arms 69 which are provided at their outer ends with openings for the passage of the sleeves 66, said sleeves being preferably locked in place, although they may be arranged to turn slightly if necessary.

The upper fixed housings are hollow, and in each housing is a two part lifting lever comprising upper and lower sections 71 and 72, the upper sections 71 being firmly secured to a rock shaft 73 that extends across the machine, passing through bearing openings in both housings, and is provided at one end with a manually operable lever 74. The section 71 is connected to the section 72 by a knuckle, or rule joint 75, and the lower end of the section 72 is provided with an opening for the passage of the sleeve 66, so that by operating the lever, or through automatic operation of the machine, the upper rear roller may be made to assume the position shown in Fig. 3, or the position shown in Fig. 4, without altering the distance between the roll shaft and the shaft 47, so that no matter what the position of the upper rear roll may be, it will be constantly rotated, so long as the shaft 47 receives movement through the bevel gears.

In order to hold the ends of the bat in proper position during the bale or core forming operation, a pair of end plates 78 is employed. Each plate is hinged to one of the front vertically guided bars, and at its rear end is provided with a pin 79 that is arranged to enter the grooves 80 of a handle operating cam 81. These cams are pivoted on the rear bars 12, and may be readily turned by hand for the purpose of moving the friction plates toward and from the ends of the rollers. When adjusted close to the ends of the rollers, the plates maintain the bat in proper position during the bale or core forming operation, and when moved outward, the ends of the bale are released to facilitate the discharge of said bale from the machine. Each plate is, also, provided with a recess 84 that is arranged to receive the sleeve 66 during the rise and fall of the upper rear roll.

Extending around the rolls 30 and 31 is a bale forming and bale delivery belt 86, the belt being endless and being guided around an idler 87 which is preferably provided with spring pressed bearings in order to keep the belt taut. This belt serves to prevent the passage of the bat down between the two rollers 30 and 31 and assists, also, in the bale forming and bale delivery operations.

The clutch operating rock shaft 55 is provided near one end with a rocker arm 87 from which hangs a rod 88 carrying upper and lower collars 89 and 90 which may be adjusted lengthwise of the rod and locked in place by suitable set screws. The rod, also, carries a pair of collars 91 and 92 which are held away from the collars 89 and 90 by compression springs 93 and 94, respectively. The spring pressed collars 91 and 92 are arranged to be engaged by an arm 95 that is rigidly secured to one of the lower movable housings, and at the upper and lower limits of movement of said housing an arm will engage with the collars 91 and 92, respectively, thereby transmitting movement to the rock shaft 55 and effecting the automatic shifting of the position of the clutch 52, so that the latter will alternately engage the bevel pinions 51 and 50 and lock the same to the shaft, thereby alternately rotating the upper rolls in opposite directions.

Figure 1:
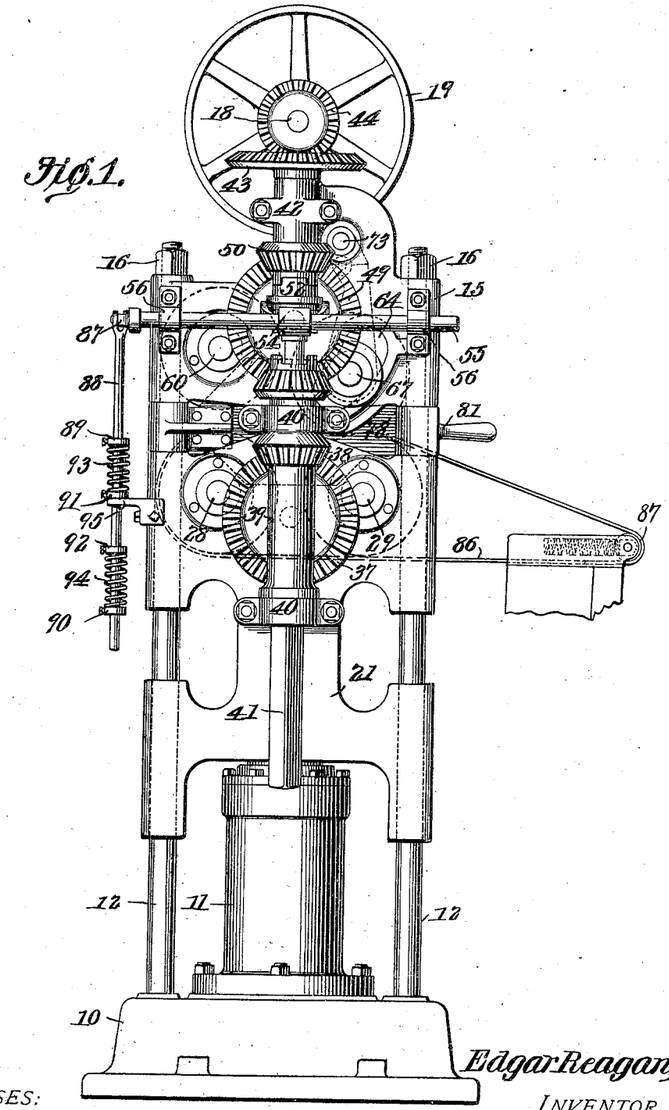
—Figure 1 is an end elevation of a bale forming press constructed in accordance with the invention.
Figure 2:
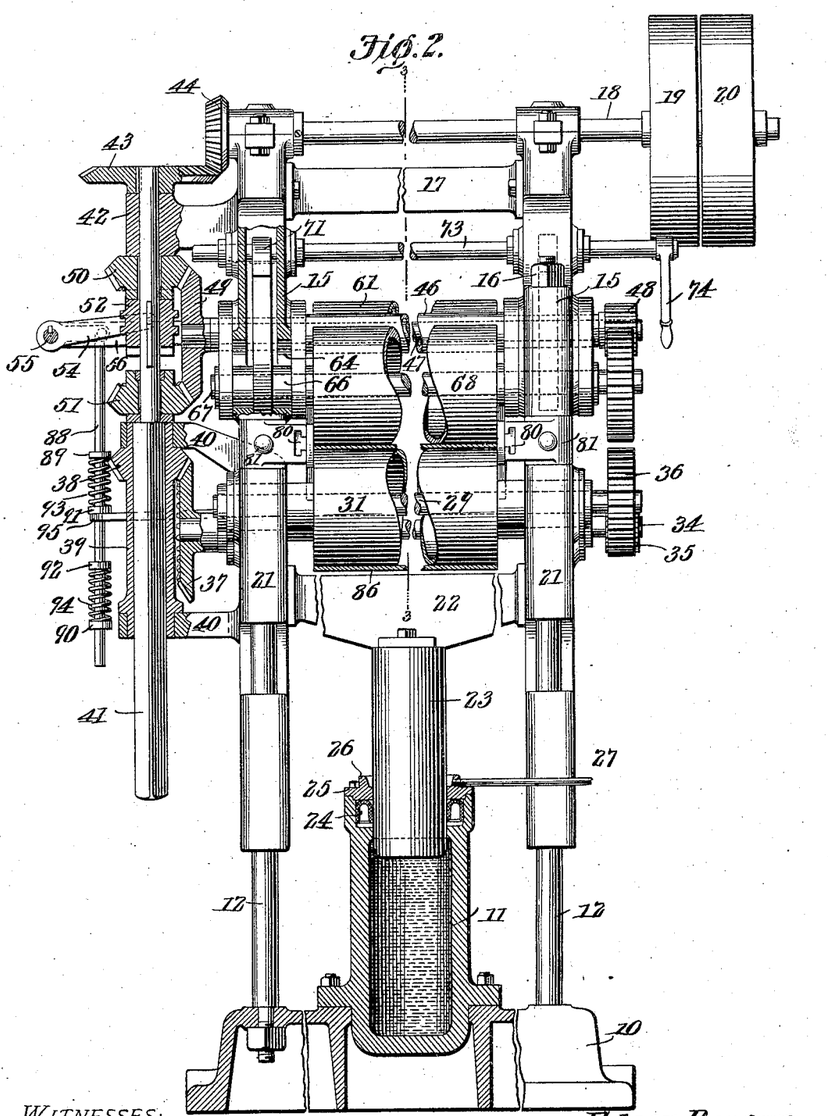
Fig. 2 is a rear elevation of the same, partly in section.
Figure 3:
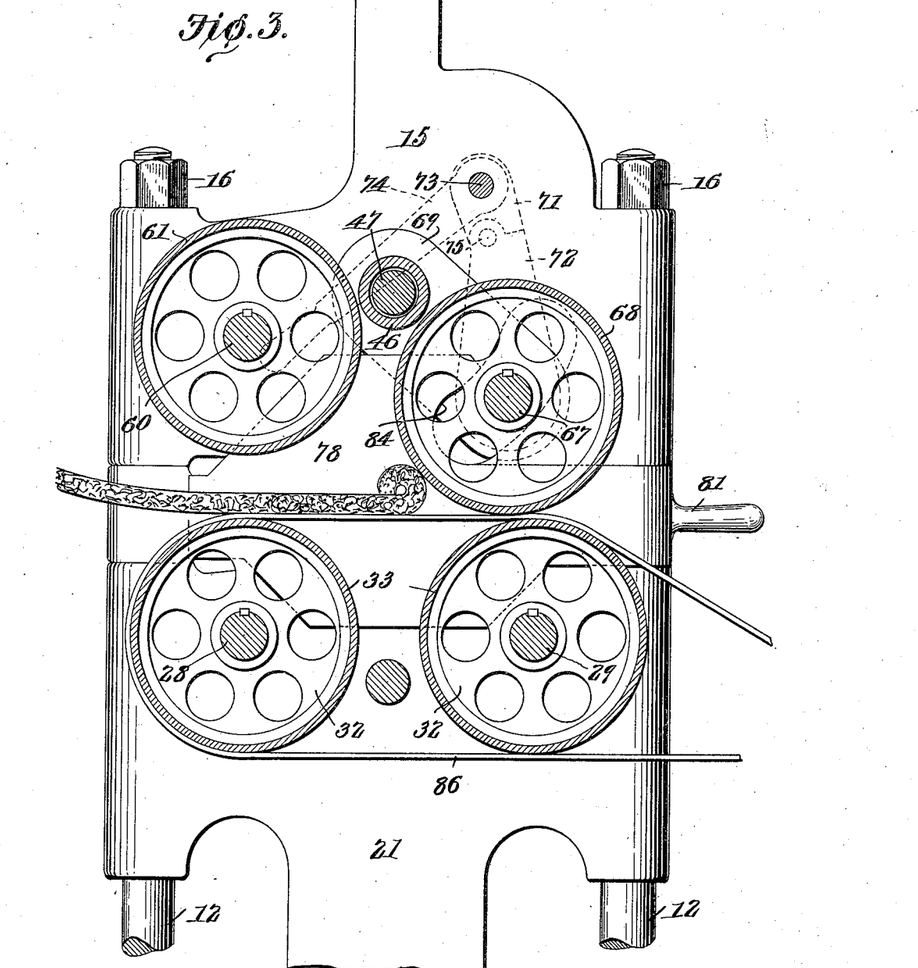
Fig. 3 is an enlarged vertical section of the press on the line 3—3 of Fig. 2, showing the parts in the position assumed at the starting of the bale forming operation.
Figure 4:
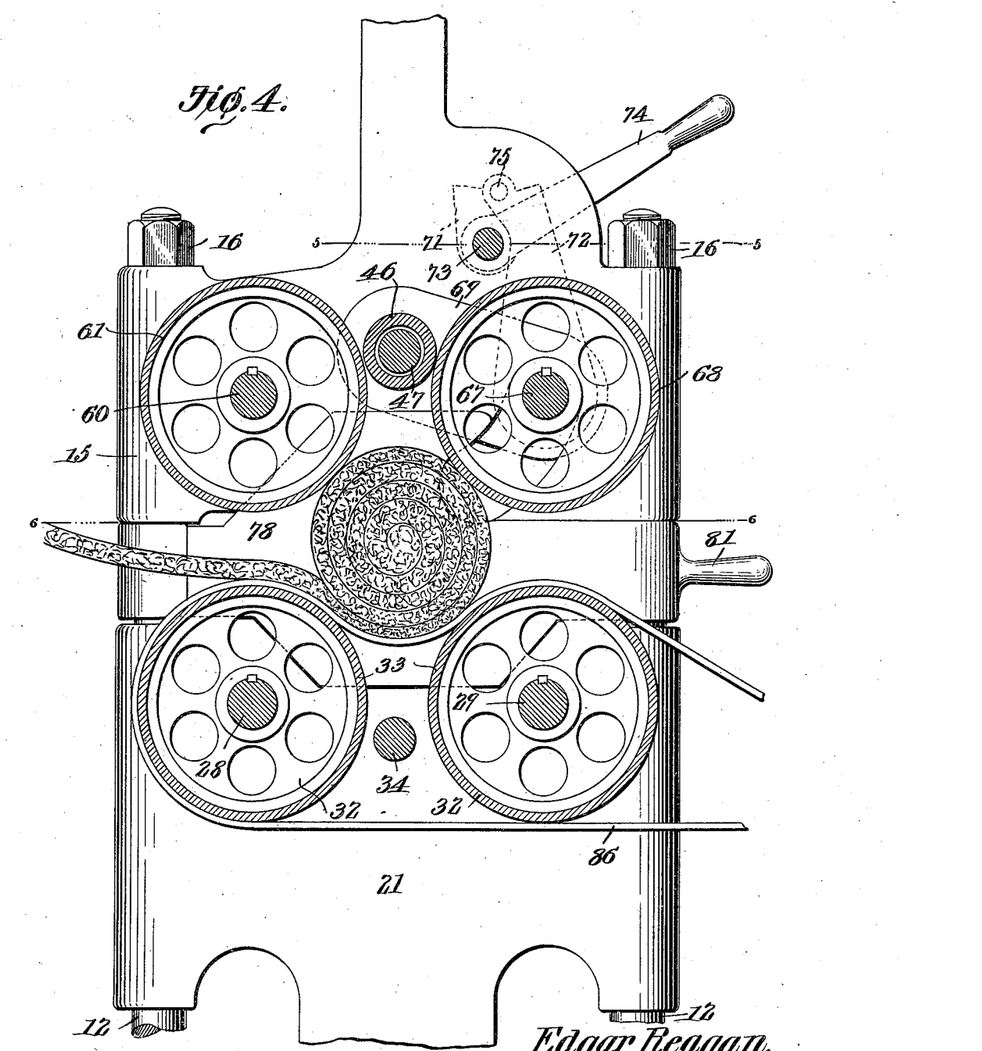
Fig. 4 is a similar view showing the position of the parts at the completion of the bale forming operation.
Figure 5:
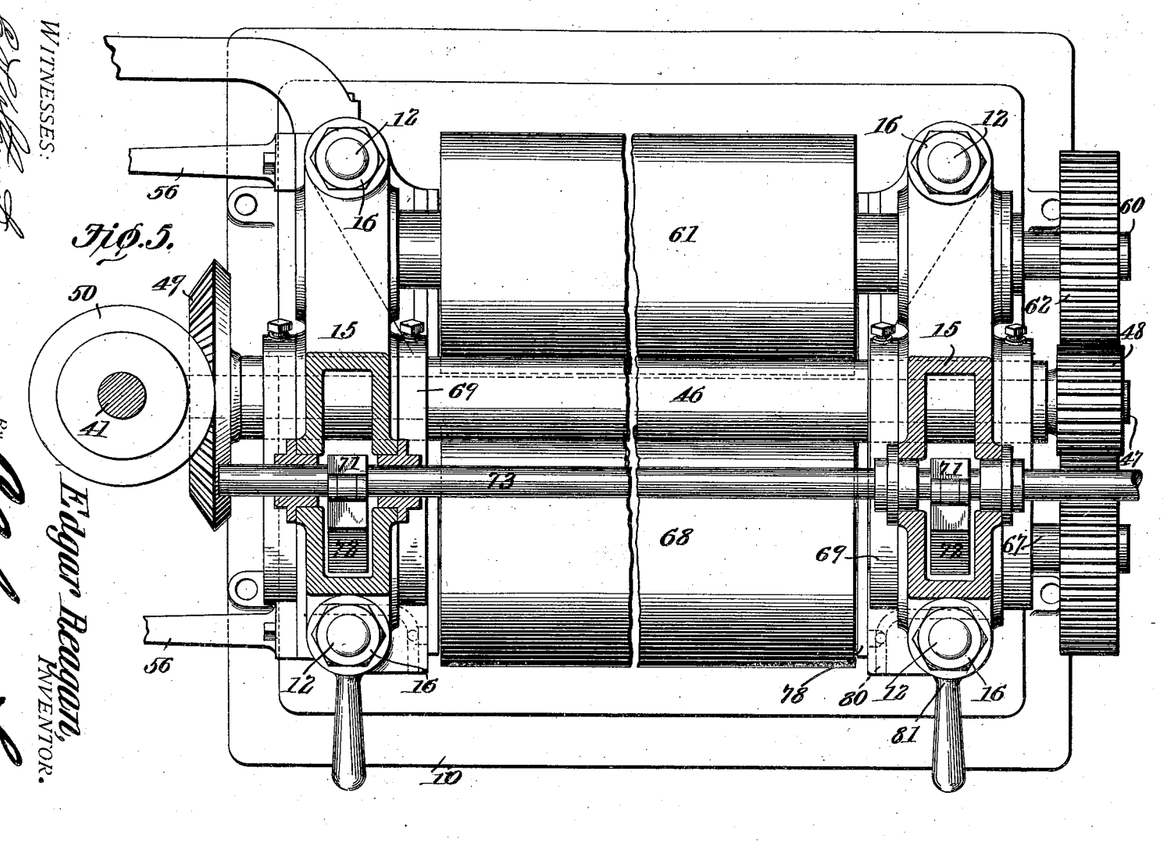
Fig. 5 is a sectional plan view of the parts on the line 5—5 of Fig. 4.
Figure 6:
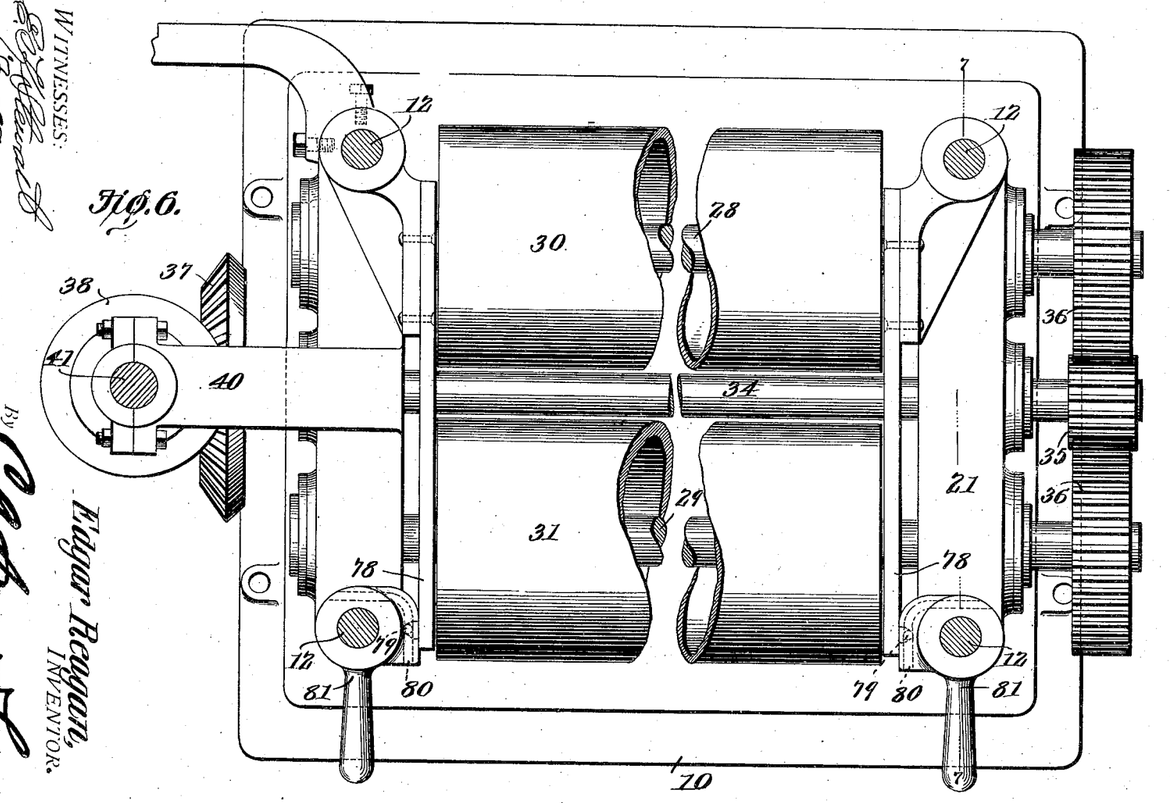
Fig. 6 is a similar view on the line 6—6 of Fig. 4.
Figure 7:
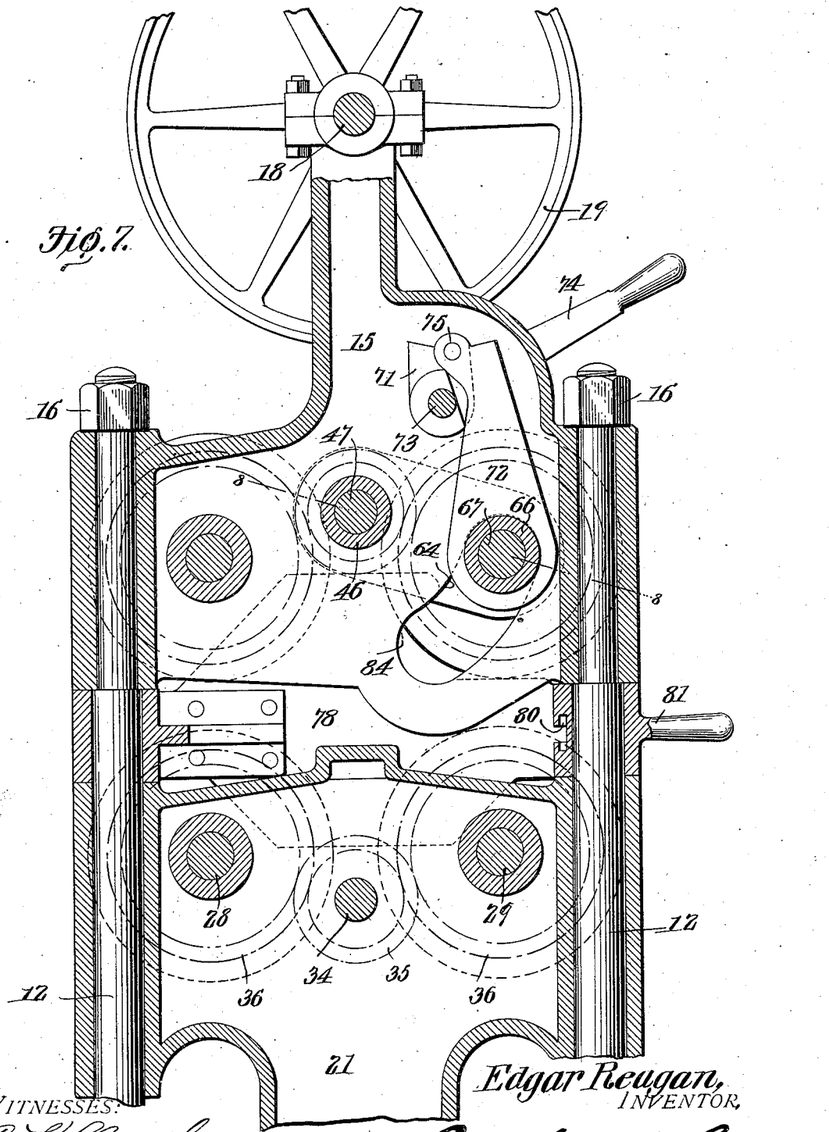
Fig. 7 is a vertical section of the press on the line 7—7 of Fig. 6.
Figure 8:
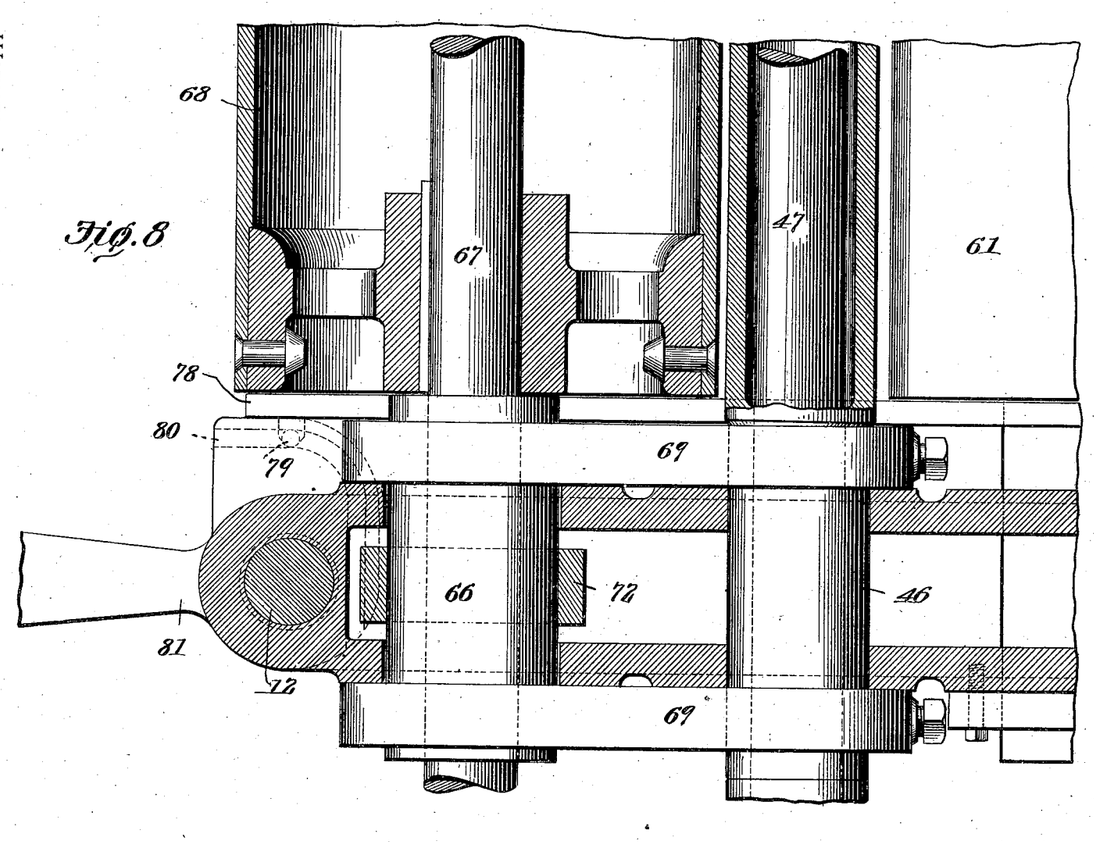
Fig. 8 is a sectional plan view of a portion of the press on the line 8—8 of Fig. 7.
Figures 9, 10, 11, 12, 13:
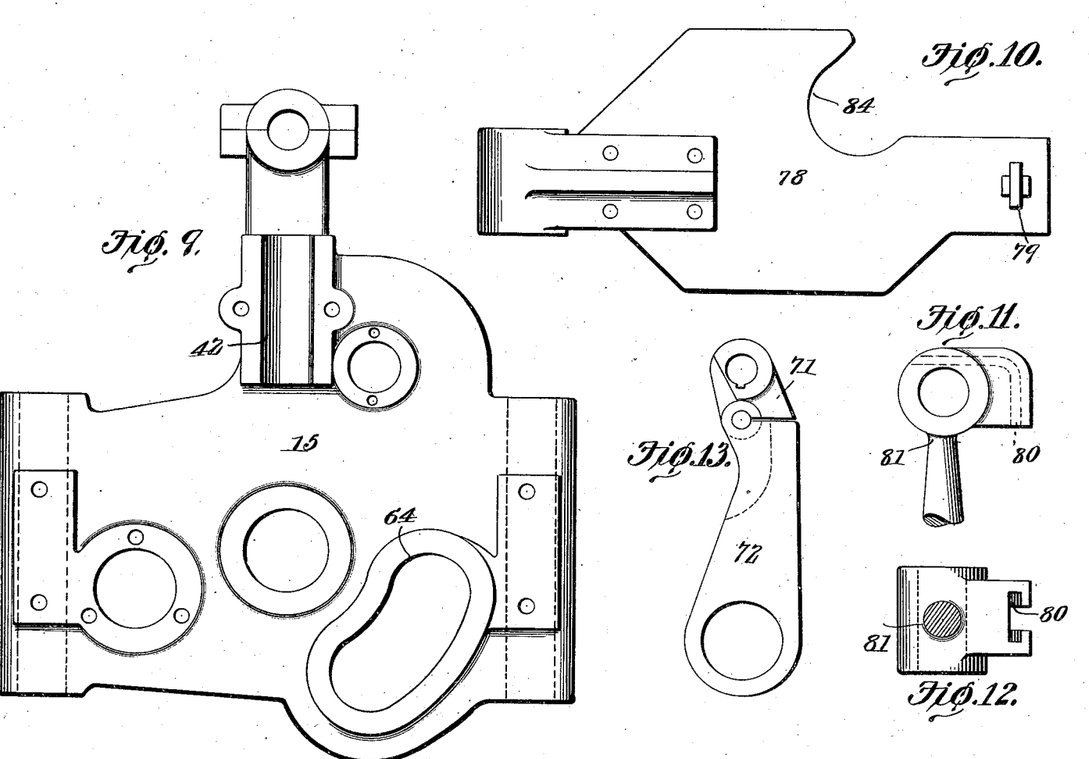
Fig. 9 is a detail view of one of the movable housings.
Fig. 10 is an elevation of one of the friction plates against which the end of the bale engages during the bale forming operation.
Fig. 11 is a plan view of one of the lever cams for operating the friction plate.
Fig. 12 is an elevation of the same showing the handled operating lever in section.
Fig. 13 is an elevation of one of the roller elevating levers.

In the operation of the machine, it being assumed that the several rolls are in the position shown in Fig. 3, and are rotating all in the same direction with respect to the periphery of the bale to be formed, the end of the bat is introduced between the lower and upper front rolls 30 and 31, and passes upon the belt 86 until it strikes against the upper rear roll 68, which immediately turns the end of the bat upwardly and rearwardly, and starts the bale forming operation. As the bale continues to increase in size, the upper roll 68 will be gradually raised to the position shown in Fig. 4, and at the same time the gradual increase in diameter of the bale will tend to force the rolls 30 and 31 downward against the resistance offered by the pressure of fluid in the cylinder 11, this pressure being gaged by suitable automatic valves, or by hand operated valves in accordance with the density of the bale desired.

After the bale has reached the desired dimensions, the arm 95 will engage against the sleeve 92 and a downward pull will be exerted on the rod 88, thereby rocking the shaft 55 and causing the clutch sleeve 52 to move downward into engagement with the clutch teeth of the bevel pinion 51, locking the latter to the constantly rotating shaft 41, and thereby transmitting movement to the upper rolls 61 and 68 in the reverse direction. At the same time the pressure in the cylinder 11 is reduced allowing the lower rolls to descend and the bale is then carried outward between the belt 86 and the upper rear roll 68, and being supported by the belt 86 is carried to any desired point of discharge. This completes the formation of the bale, and the parts may be readjusted in any suitable manner, but where the machine is intended for use as a preliminary core forming machine to be used in connection with a main roller press, it is desirable, in order to secure the best results, that the small bale or core formed by this machine be delivered to said main press without breaking or severing the bat, and further that the present machine be utilized during the subsequent bale forming operation as a means for condensing the bat preliminary to its delivery to the main machine. For this purpose, therefore, the small bale or core being delivered from the machine, is carried by the belt 86 toward the main machine, and the upper rear roll 68 is lowered by turning the shaft 73 until said roll rests on top of the bat, and if the housings which support the lower rolls are elevated, the degree of pressure imposed on the bat will be determined by the weight of said roll, this being ample for ordinary purposes. During the main baling operation, therefore, the present machine is utilized for the purpose of condensing the bat, and the parts will remain in the bat condensing condition until the bale is completely formed. When this occurs, it is desirable to stop the operation of the main press in order to complete the covering of the main bale and the delivery of said bale from the press, and during this interval it is necessary to take care of the bat as the latter is delivered from the gin or other machine. To accomplish this it is merely necessary to elevate the lower housings and rolls 30 and 31 to the highest point, which may be accomplished by introducing fluid under pressure into the cylinder 11, either automatically or by manually operated valves. When this is accomplished, the arm 95 will move into engagement with the collar 91 and the rod 88 will be elevated, thereby transmitting movement to the clutch sleeve operating shaft, and said clutch sleeve will be moved upward into engagement with the upper bevel pinion 50, thereby reversing the direction of movement of the two upper rolls. As soon as this occurs, the upper rear roll will act to tear or sever the bat, turning the latter backward and automatically starting a second bale or core forming operation, and this continues until the bale or core is delivered either automatically or otherwise from the machine, it being desirable, of course, that the operation should be continued for a length of time sufficient to permit the delivery of the complete bale from the main press and the starting of said main press into operation.

I claim:—

1. In baling apparatus, a roller press, including upper and lower rolls, one of the upper rolls being arranged to rest by gravity in engagement with the bale, and being movable upward as the bale gradually increases in diameter, the lowermost rolls being movable during further increase in the diameter of the bale, and means for resisting the downward movement of said rolls.

2. In a baling press, a pair of upper rolls, one of which is arranged to rest by gravity on material being baled and to operate in advance of the other during the preliminary bale forming operation, stationary bearings for the other roll, a pair of lower rolls, and means for limiting the upward travel of the movable upper roll when it has reached approximately the horizontal plane of the other upper roll.

3. In a baling press, the combination with a plurality of rolls arranged in upper and lower pairs, one of the rolls of the upper pair resting by gravity on the bale and being movable upward as the bale gradually increases in diameter, and sectional carrying levers forming a support for said roll.

4. The combination in a baling press, of rolls arranged in upper and lower pairs, one of the rollers of the upper pair resting by gravity on the bale being formed, sectional levers forming a support for the roll, and serving to sustain the roll in its extreme upper and extreme lower positions, and means for guiding the roll as it moves between its two extreme positions.

5. In a baling press, a pair of lower rolls, means for resisting their downward movement during the formation of a bale, a pair of upper rolls, one of which is arranged to rest by gravity on the bale being formed, a pair of guiding links for said movable roll, a rock shaft, and a pair of sectional roll supporting levers extending between the rock shaft and the roll, the sections of each lever being connected by a knuckle or rule joint.

6. In a baling press, a pair of lower rolls, means for resisting downward movement of said rolls during the baling operation, a pair of upper rolls, one of which is movable upward by the gradual accumulation of material of which the bale is formed, a pair of links carrying said movable roll, a rock shaft, a pair of sectional levers extending between the rock shaft and said movable roll, the sections of each lever being connected by a knuckle or rule joint, and an operating means connected to the rock shaft to permit the lowering of said roll to bat engaging position.

7. In a roller press for the manufacture of coreless bales, a pair of lower rolls, an endless apron guided around said rolls, a spring held idler for maintaining the apron taut, and in an approximately straight line between the upper portions of the lower rolls at the starting of each operation said apron affording an approximately horizontal supporting surface for the first of the bat, and a pair of upper rolls one of which rests by gravity on the apron and the bat during the bale forming operation.

8. In a roller press for the manufacture of coreless bales, upper and lower pairs of compression rolls, one of said upper rolls being arranged to rest by gravity on the material being operated upon, an endless apron passing around the two rolls of the lower pair and coacting with the movable upper roll to start the bale forming operation, and means for holding the apron taut and in an approximately straight line between the upper portions of the lower rolls at the starting of each operation.

9. In a bat compressing and bale forming press, a series of bale forming rolls, one of the rolls at the exit side of the press being movable independently of the other to engage the bat and start the formation of the bale, and means for reversing the direction of rotation of such roll.

10. In a bat compressing and bale forming press, a series of compression rolls, means for moving one of the rolls independently of the others to close the exit side of the press, and by engagement with the bat to start the formation of the bale, and means for reversing the direction of rotation of said roll.

11. In a baling press, a plurality of compression rolls, means for revolving the rolls in the same direction with respect to the bale during the bale forming operation, and means for reversing the direction of movement of one of the rollers to effect discharge of the bale.

12. In a baling press, upper and lower pairs of compression rolls, means for driving the rolls in the same direction with respect to the bale during the bale forming operation, and means for reversing the direction of movement of the upper pair of rolls to feed the finished bale from the press.

13. In a roller press, upper and lower compression rolls, an endless delivery apron passing around the lower rolls, means for driving the several rolls and the apron in the same direction with respect to the bale during the bale forming operation, and means for reversing the direction of movement of the upper rolls to assist in the delivery of the bale.

14. In a baling press, upper and lower pairs of compression rolls, one of the upper rolls being freely movable by gravity against the material being formed into a bale, a discharge apron passing around the lower rolls, means for holding the apron taut, means for driving all of the rolls and the apron in the same direction with respect to the bale during the bale forming operation, and means for automatically reversing the direction of movement of the upper rolls to assist in discharging the finished bale.

15. In a baling press, two pairs of pressure rolls, movable housings carrying one pair of rolls, a fluid pressure means for resisting the movement of said housings during gradual increase in diameter of the bale, a clutch mechanism for effecting the reversal of the direction of movement of a second set of rolls, and means under the control of the movable housing for operating said clutch.

16. In a baling press, a plurality of pairs of rolls, and movable housings carrying one pair of rolls, means for resisting the movement of the housings, a driven shaft, gearing connections between the shaft and the movable rolls, gearing connections engaging a clutch between the shaft and the relatively stationary rolls, a clutch operating arm, and an adjustable clutch operating mechanism under the control of one of said movable housings.

17. In baling mechanism, a plurality of rolls, and means for adjusting and driving them to alternately form bat condensing and bale forming members.

18. In baling mechanism, a plurality of pressure rolls adapted to wind a bat into the form of a bale, one of said rolls being independently adjustable with respect to the other to form a bat condenser.

19. In bale forming apparatus, a stationary frame, a pair of upper fixed housings supported thereby, a pair of lower housings arranged to move vertically of the frame, upper and lower pairs of rolls supported by the housings, roll shafts, gears thereon, upper and lower transverse shafts, each having a pinion at one end arranged to engage the gears of the rolls to be driven, bevel gears arranged at the opposite ends of the shafts, a vertically disposed driven shaft having a non-circular portion, an elongated sleeve mounted on the non-circular portion of the shaft and provided with reduced ends, brackets projecting from the movable housing and forming bearings for the reduced ends of the sleeve, a bevel pinion carried by the sleeve and engaging the bevel wheel of the lower shaft, an upper shaft bearing carried by one of the fixed housings, a pair of loose bevel pinions mounted on the shaft and engaging the bevel wheel of the upper shaft, a clutch sleeve feathered on the shaft and movable to clutch one or other of the loose bevel pinions, a rock shaft, a clutch operating arm carried thereby, a rocker arm on the shaft, a rod depending therefrom, a pair of adjustable collars carried by the rod, spring pressed collars also mounted on the rod, and an arm projecting from one of the movable housings and embracing the rod at a point between the two spring pressed collars.

20. In a baling press, the combination with a frame including a plurality of vertically disposed supporting bars, housings mounted thereon, rolls carried by the housings, end plates pivoted to one set of bars, and cam levers carried by the second set of bars for engaging and moving said end plates into and out of contact with the ends of the bale.

21. In apparatus of the class described, a revoluble bat condensing member, and means for reversing its direction of movement in order to tear or sever the bat.

In testimony that I claim the foregoing as my own, I have hereto affixed my signature in the presence of two witnesses.

EDGAR REAGAN.

Witnesses:
R. M. TARLTON,
P. H. SWEDSINGLE.